United States Patent [19]

Meatto

[11] Patent Number: 5,087,503

[45] Date of Patent: Feb. 11, 1992

[54] COMPOSITE CONSTANT STRESS BEAM WITH GRADIENT FIBER DISTRIBUTION

[75] Inventor: Franklin D. Meatto, Cromwell, Conn.

[73] Assignee: Pacific Coast Composites, Inc., San Marcos, Calif.

[21] Appl. No.: 407,877

[22] Filed: Sep. 14, 1989

[51] Int. Cl.⁵ .................. B32B 3/00; D04H 1/58; D32B 17/10
[52] U.S. Cl. .................... 428/162; 428/170; 428/78; 428/273; 428/288; 428/268; 428/415; 428/417; 428/408; 267/47; 264/331.11; 264/258
[58] Field of Search .............. 428/415, 417, 268, 78, 428/170, 162, 172, 288, 273

[56] References Cited

U.S. PATENT DOCUMENTS 3,585,094 6/1971 Ruggles .................. 428/417 X
4,339,490 7/1982 Yoshioka et al. ......... 428/417 X

FOREIGN PATENT DOCUMENTS 723149 12/1965 Canada ..................... 428/417

Primary Examiner—P. C. Sluby
Attorney, Agent, or Firm—Ralph D'Alessandro

[57] ABSTRACT

A composite beam having a constant stress geometry is provided wherein a varying fiber content in a fiber impregnated resin is employed across the beam's cross section to cause the neutral axis of the beam to shift toward the compressive side. The design provides the maximum deflection in the direction of the load before compressive failure occurs for a given size and shaped beam of equivalent stiffness.

15 Claims, 3 Drawing Sheets

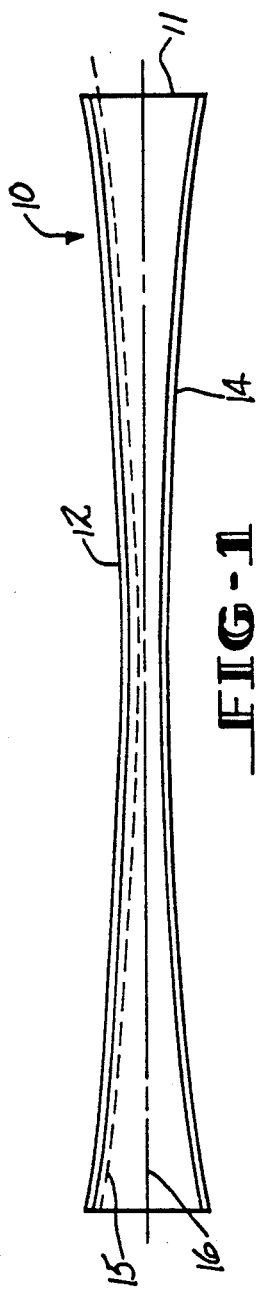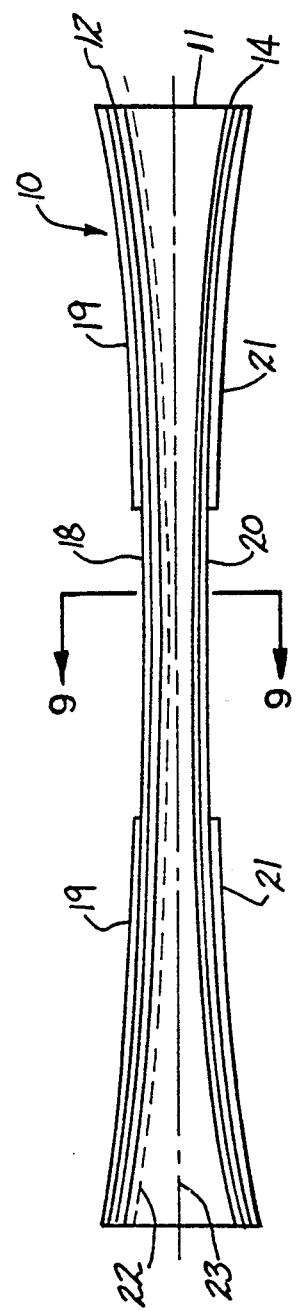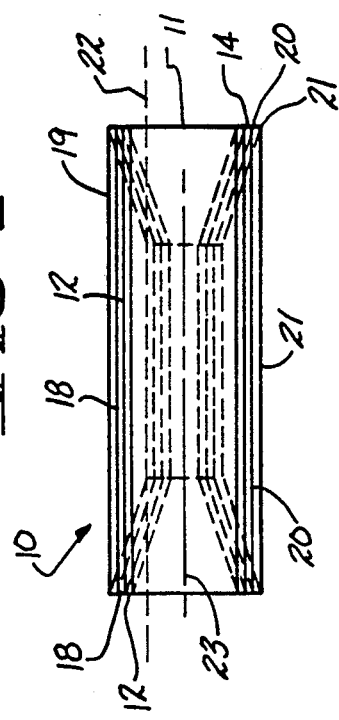

COMPOSITE CONSTANT STRESS BEAM WITH GRADIENT FIBER DISTRIBUTION

FIELD OF THE INVENTION

This invention relates to generally to resilient beams or springs, and more particularly, to composite constant stress beams having gradient or varying fiber distribution. Such beams may be used in vehicular spring, flat spring, or other appropriate applications requiring both a high strain to failure and fatique resistant structure.

BACKGROUND OF THE INVENTION

Composites have been used in an increasing number of applications to replace metal where lower weight, corrosion resistance and greater fatigue resistance has been required or desirable. Composite spring elements are well known. Various patent disclosures reveal either composite structures alone or in combination with other materials, such as rubber, especially in automotive applications. As an example, U.S. Pat. No. 2,559,105 discloses a composite metal and rubber leaf spring, while U.S. Pat. No. 3,142,598 discloses a different type of leaf spring using resin impregnated fiberglass. Epoxy/glass fiber springs have been introduced which are interchangeable with conventional steel leaf springs in automobiles.

However, the introduction of these composites has not been without problems. Most current composite spring applications are limited by the manufacture employed and the inherent anisotropic nature of resin impregnated glass fiber. While pretensioning the glass fibers in the epoxy resin matrix by the techniques of pulforming or pultrusion is old and well known, a continuing limitation in the manufacture of composite beams such as springs has been the constant or uniformly thick cross-section required and the essentially uniform fiber distribution in that cross section. The ability to successfully shape composite springs without creating the potential for failure due to buckling because of exposed glass fibers that breed surface microcracks in the epoxy retaining matrix has heretofore not been successfully accomplished. Further, the ability to tailor the strength of the final composite structure by varying the positioning of the glass fibers relative to the cross section of the structural beam has not heretofore been successfully accomplished. These problems are solved in the design of the present invention that employs a constant stress beam with a gradient fiber distribution in the plane of deflection.

SUMMARY OF INVENTION

It is an object of the present invention to provide in a constant stress beam having continuous fiber reinforcement in a resin matrix, a gradient fiber distribution that achieves the highest strength to failure design per given beam volume and equivalent stiffness in the most space efficient design.

It is another object of the present invention to provide in a constant stress beam reinforcing fibers that extend normal to the direction of deflection with varying or gradient fiber distribution in the plane of deflection to create a fiber gradient across the thickness of the beam.

It is still another object of the present invention to be able to designably shift the position of the neutral axis of the beam toward the compression side of the beam to increase the overall composite beam yield strength in flexure by reducing compressive stress on that side.

It is a feature of the present invention that a designable fiber gradient is achieved by applying a different percentage by weight reinforcing fiber to laminate facing plates or layers over a central core of lower percentage by weight fiber content.

It is another feature of the present invention that unidirectional reinforcing fiber normal to the direction of beam deflection is achieved with varying fiber distribution across the thickness of the beam.

It is still another feature of the present invention that the beam is formed by pullforming, then shaped by contour grinding, and optionally having facing laminate layers or plates adhesively molded with heat and pressure over the shaped section.

It is yet another feature of the present invention that a higher percentage by weight of reinforcing fiber is designably obtainable on the compression side of the loaded beam.

It is an advantage of the present invention that the outermost layer or facing of the beam which has the highest normal stress has the greatest concentration of fiber.

It is another advantage of the present invention that compressive failure is reached at a higher degree of deflection than with a comparably shaped beam of equal size, stiffness and volume not having the gradient distribution of reinforcing fiber.

These and other objects features and advantages are obtained by providing a composite constant stress beam having reinforcing fiber in a resin matrix a fiber distribution gradient across the thickness of the beam with fibers that are oriented normal to the direction of deflection to achieve the highest flexural strength and thus highest deflection to failure design per beam volume and stiffness in the most space efficient manner.

In one embodiment of the invention a relatively thick core beam is pulformed with a relatively low fiber content and then is machined to a desired contoured geometry required for the final constant stress beam application. Several thin facings or laminate layers are then adhesively applied to both sides of the shaped core to form the final constant stress beam geometry required. Curving of the beam can be accomplished at this point, if necessary, by molding with heat and pressure. The fiber content of the thin facings or laminate layers is varied to yield volumetrically the highest efficiency beam by tailoring the fiber content on the highest stressed outer facing on the compression side of the loaded beam.

BRIEF DESCRIPTION OF THE DRAWINGS

The advantages of this invention will become apparent upon consideration of the following detailed disclosure of the invention, especially when it is taken in conjunction with the drawings wherein:

FIG. 1 is a side elevational view of a constant stress composite beam having a continuous facing layer showing the shifted neutral axis;

FIG. 2 is a side elevational view of a constant stress composite beam having a plurality of facing layers and a discontinuous outer facing layer;

FIG. 3 is a end elevational view of the constant stress composite beam of FIG. 2;

DETAILED DESCRIPTION

Figure 4:
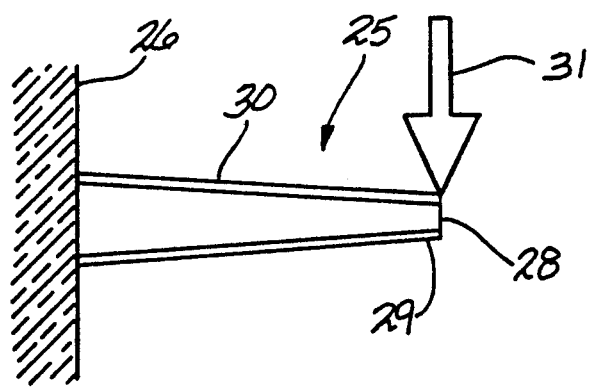
FIG. 4 is a side elevational view of a cantilevered constant stress composite beam having a continuous facing layer and end load.

FIG. 1 shows a side elevational view of a constant stress composite beam 10 having an elongated central core portion 11 and a top facing layer or laminate 12 and a bottom facing layer or laminate 14. The core portion 11 and the facing layers 12 and 14 are formed from pulformed fiber impregnated resin. Facing layers 12 and 14 are continuous and the top facing layer 12 would have the highest fiber content, when compared to the elongated central core portion 11 and the bottom facing layer 14, in a plane normal to a downwardly oriented load (not shown) and the direction of deflection. This top facing layer 12 is the location of the highest normal stress and the maximum compressive stress. The resultant constant stress composite beam 10 has a varying fiber content or gradient across its cross section that has the highest fiber content in the top facing layer 12, lower fiber content in the bottom facing layer 14, and the lowest fiber content in the elongated central core portion 11. Typical fiber contents for each, expressed in percent by weight, run from about 50 percent to about 78 percent by weight from the central portion 11 to the top facing layer 12 and optimally about 55 percent to about 75 percent to obtain the strongest beam for the comparable size, stiffness and volume of a given material. The fiber content for the bottom facing layer runs intermediate the 55 to 75 percent. FIG. 1 shows the centerline 16 of the beam where the neutral axis would lie without the gradient fiber distribution and the shifted neutral axis 15 with the gradient fiber distribution.

Figure 9:
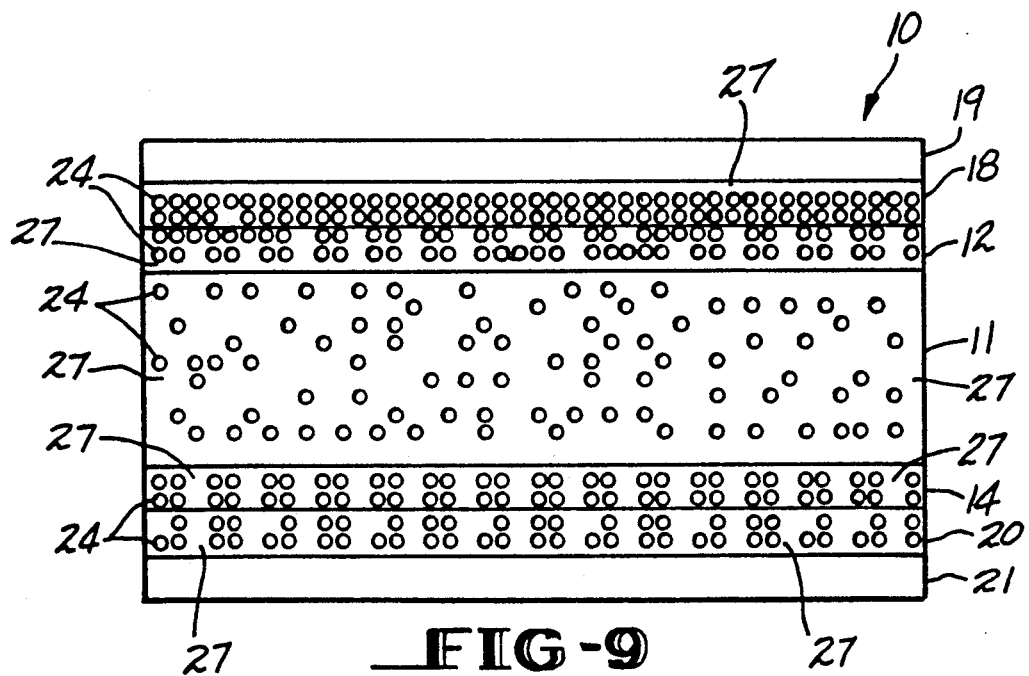
FIG. 9 is a sectional view taken along lines 9—9 of FIG. 2 showing the fiber content distribution in the constant stress composite beam.

This varying of the percent by weight of the fiber content across the cross section of the constant stress composite beam 10 is better illustrated in FIGS. 2, 3 and 9 where tailoring of the fiber content in the cross section is accomplished with additional facing layers or laminates of different fiber content.

FIG. 2 shows the central core portion 11 of FIG. 1 with the top and bottom facing layers 12 and 14. The top facing layer 12 has an additional continuous second top facing layer 18 adhesively bonded to it and a top discontinuous layer 19 extending inwardly from the ends of beam 10 to an area adjacent the center of the beam 10. Similarly, the bottom facing layer 14 has an additional continuous second bottom facing layer 20 adhesively bonded to it and a bottom discontinuous facing layer 21 extending inwardly from the ends of beam 10 to an area adjacent the center of beam 10.

Representative fiber content in the cross section of the beam 10 to tailor the structure to achieve a beam capable of a higher degree of deflection before compressive failure than comparably shaped and sized beams of equivalent stiffness non-gradient beams, expressed in percent by weight, can be given for the beam illustrated in FIG. 2. The elongated central core portion will have the lowest fiber content, in this instance about 55%, although it is to be understood that this could vary to as low as 50% or less and to as high as about 60%. It is understood that the greatest flexural strength or maximum normal stress capacity of the fibers in the outer layer has been obtained when the gradient or variation in the cross sectional distribution of the fiber content is greatest between the central core portion and the outer most facing layer on the side of the beam experiencing the compressive loading force. Consequently, assuming loading oriented in a downwardly vertical direction, the highest fiber content is located in the facing layers above the central core portion 11. This fiber distribution shifts the neutral axis 22 the greatest distance toward the side of the beam 10 experiencing the compressive loading force. The discontinuous top facing layer 19 has about 75% by weight fiber content. The second top facing layer 18 has about 73%, while top facing layer 12 has about 71%. On the bottom side of the beam 10, the gradient is arrayed so that the higher fiber content is adjacent the central core portion 11. Bottom facing layer 14 has about 63%, second bottom facing layer 20 about 61%, and bottom discontinuous layer 21 has about 59%. It could conceivably be possible that one or more of the bottom facing layers could have a lower fiber content than the core portion 11.

Thus, the fiber content of the beam 10 varies across the cross section illustrated in FIG. 9 from about 75% on the discontinuous top facing layer 19 where the compressive force is experienced to about 59% on the discontinuous bottom facing layer to effectively shift the neutral axis, which represents the point of zero normal stress, from the center liness 23 of the beam to the neutral axis 22. This shift permits the beam to withstand greater compressive stress before failure. This shift is also seen in FIG. 3. A representative Young's Modulus of flexure for the plurality of facing layers in a composite constant stress beam with the above-described fiber content gradient across its cross section is from about 4.1 to about 6.4 million pounds per square inch.

FIG. 9 diagrammatically illustrates the fiber content distribution in the beam 10, showing the lowest concentration of fibers 24 or lowest fiber content in the central core portion 11 and increasing in the upper facing layers 12 and 18. Since the section 9—9 is taken through the center of the beam 10, there is no section through the discontinuous top and bottom facing layers 19 and 21, respectively. The fibers 24 are imbedded in a resin matrix 27 in each layer illustrating the lowest fiber content in the central core portion 11, an increasing content in top facing layer 12 and the highest content in top facing layer 18. Bottom facing layer 14 is shown having a higher fiber content than the core portion 11 and than the continuous second bottom facing layer 20.

The top and bottom facing layers are adhesively fastened to the central core portion 11 and their immediately adjacent layer by a suitable adhesive, such as an epoxy sold by Shell under the tradename Epon 9000 or Ciba Geigy's Ren grades RP136/H994 or RP138/H994. Suitable fibers include E-glass, S-glass or a hybrid of graphite and glass, or all graphite as an intermediate layer below a top compression layer where there is anisotropic behavior in strength. For example S-glass typically has a tensile strength of 215 Kpsi and a compressive strength of about 95 Kpsi. This anisotropic tensile and compressive strength pattern of the fibers permits the tailoring of the fiber gradient in the cross section to load the compressive side of the beam to shift the neutral axis toward the compressive side and maximize the use of the higher tensile strength property.

FIGS. 4-8 illustrate alternate applications or embodiments of constant stress composite beams employing fiber gradients through their cross sections. FIG. 4 shows a cantilevered constant stress composite beam 25 anchored to support 26 with end load 31. The central core portion 28 has a top facing layer 30 and a bottom facing layer adhesively secured thereto. This beam 25 is illustrative of the type of constant stress composite beam employable in, for example, chair or automotive springs, or an archery bow.

Figure 5:
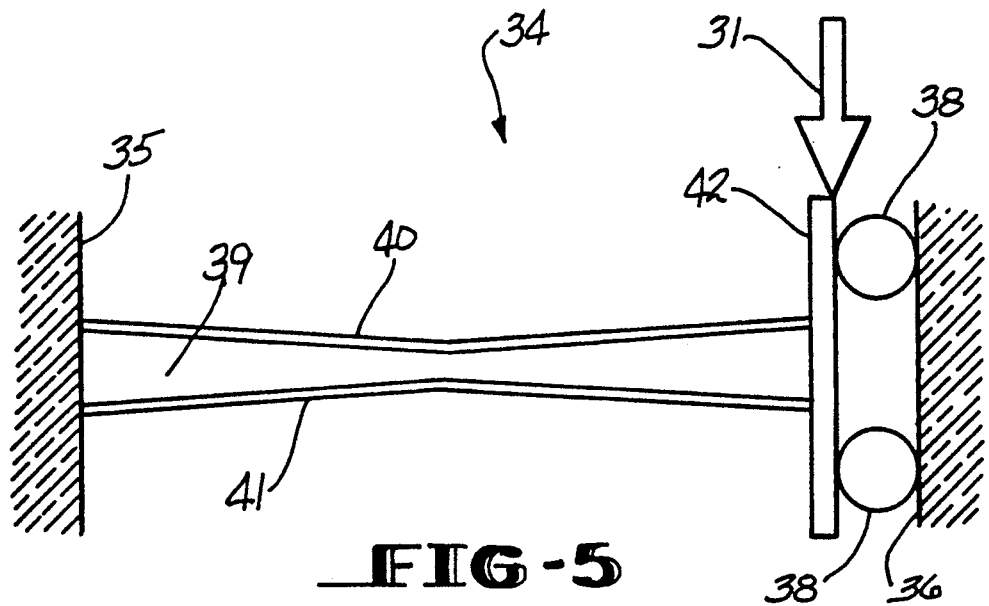
FIG. 5 is a side elevational view of a constant stress composite beam having an end anchored to a support and the opposing end adjacent the load movably positioned against the support rollers.
Figure 6:
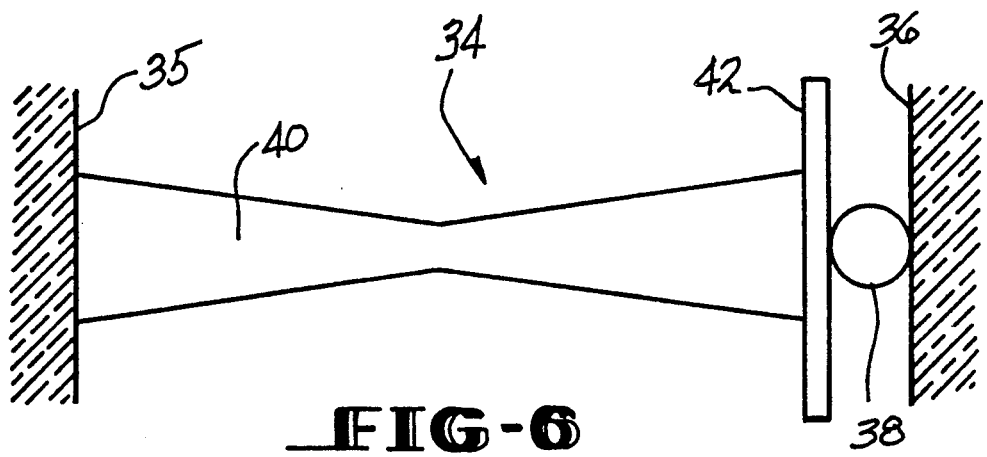
FIG. 6 is a top plan view of the constant stress composite beam of FIG. 5.

FIGS. 5 and 6 illustrate an application using a beam with one end fixed and the opposing end rotationally constrained in the plane of bending. The constant stress composite beam 34 is anchored to support 35, while the opposing end is constrained by rollers 38 against support 36. The beam 34 has a central core portion 39 with continuous top and bottom facing layers 40 and 41, respectively, with varied fiber content. The end loading 31 is applied to plate 42.

Figure 7:
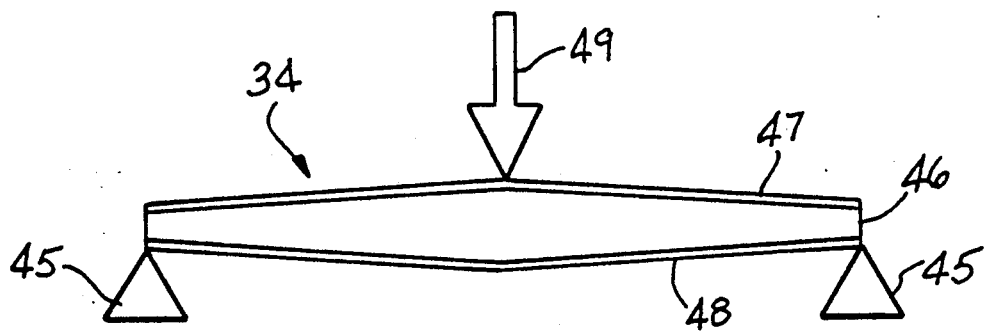
FIG. 7 is a side elevational view of a constant stress composite beam having end supports with an intermediate load.
Figure 8:
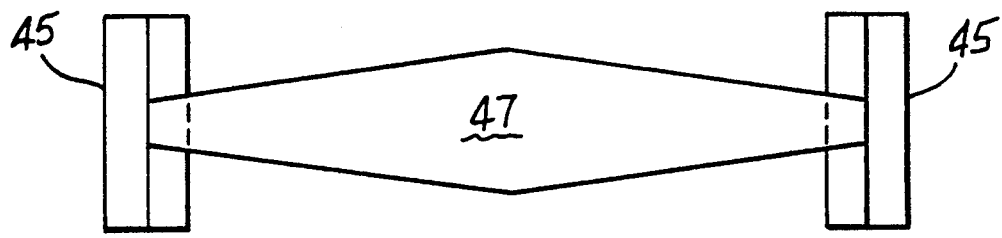
FIG. 8 is a top plan view of the constant stress composite beam of FIG. 7.

FIGS. 7 and 8 illustrate a variation of a constant stress composite beam 34 having end supports 45 with intermediate loading 49. The beam 34 has a central core portion 46 with a continuous top facing layer 47 and bottom facing layer 48. This type of beam can be applied to rear automotive springs.

The shifting of the neutral axis toward the compressive side of the composite beam designed with a constant stress geometry is based on the formula for determining the maximum normal stress, Sigma. Sigma equals Mc/I where M is the bending moment, I is the moment of inertia about an axis parallel to the direction of deflection of the beam, and c is the location of the neutral axis on the beam. Shifting the location of the neutral axis, which represents the plane of zero normal stress, by tailoring the fiber content of the beam allows the composite beam to be designably controlled to provide maximum deflection before compressive failure occurs for a beam of a given size, shape and stiffness.

While the preferred structure in which the principles of the present invention have been incorporated is shown and described above, it is to be understood that the invention is not limited to the particular details thus presented but, in fact, widely different means may be employed in the practice of the broader aspects of the invention. For example, it is possible to achieve a beam with the desired varying or gradient cross sectional fiber distribution and fiber content illustrated in FIG. 9 in a single layered pulformed structure without the need to use adhesively applied laminate layers. The scope of the appended claims is intended to encompass all obvious changes in the details, materials and arrangements of parts will occur to one of ordinary skill in the art upon reading of this disclosure.

What is claimed is:

1. A constant stress composite beam having a first side and an opposing second side with a center line passing therebetween and being deflectable in a given direction in response to a force applied in the given direction causing compressive force on the first or opposing second side, the beam having in combination:
   (a) an elongated central core portion formed by pulforming a fiber impregnated resin, the core portion having a first fiber content and at least a first surface normal to the direction of deflection on the side of the compressive stress and a second opposing surface normal to the direction of deflection;
   (b) a plurality of facing layers of fiber impregnated resin adhesively fastened to the first and second opposing surfaces, each of the facing layers normal to the direction of deflection having a higher fiber content than the first fiber content of the core portion to produce a composite beam with a cross section having a varying fiber content thereacross such that the highest fiber content of between greater than about 63 to about 78% by weight is adjacent the first surface of the core portion on the side of the compressive stress in at least one facing layer that is normal to the direction of deflection where the highest stress normal to the direction of loading is located and the compressive stress is a maximum.

2. The composite beam according to claim 1 wherein the elongated core portion has a first neutral axis extending therethrough above the center line of the beam generally parallel to the core portion, the neutral axis of the composite beam beings shifted toward the surface of the core portion adjacent the highest fiber content.

3. The composite beam according to claim 2 wherein Young's Modulus of flexure for the plurality of facing layers is from about 4.1 to about 6.4 million pounds per square inch.

4. The composite beam according to claim 3 wherein the resin is epoxy and the fiber is glass.

5. The composite beam according to claim 2 wherein the fibers are pretensioned in the plurality of facing layers.

6. The composite beam according to claim 2 wherein the fiber content in at least one facing layer on the second opposing surface is from about 55% to about 75% by weight.

7. The composite beam according to claim 6 wherein the plurality of facing layers are continuous.

8. The composite beam according to claim 6 wherein the plurality of facing layers are discontinuous.

9. The composite beam according to claim 6 wherein the plurality of facing layers includes at least one on each opposing surface of the elongated central core portion.

10. The composite beam according to claim 6 wherein the plurality of facing layers includes at least two on the opposing surface of the elongated central core portion having the highest compressive stress.

11. The composite beam according to claim 6 wherein the beam is further contoured by machining so that the cross-section is thickest where the highest stress is experienced and thinnest where the lowest stress is experienced.

12. The composite beam according to claim 6 wherein the fiber content of the central core portion is from about 50% to about 60% by weight.

13. A resilient constant stress composite beam for use in spring applications having a first side and an opposing second side with a center line passing therebetween and being deflectable in a given direction in response to a force applied in the given direction causing compressive force on the first or opposing second side, the beam having in combination:
   (a) an elongated central core portion formed by pulforming a fiber impregnated resin, the core portion having a first fiber content of about 50% by weight and at least a first surface normal to the direction of deflection on the side of the compressive stress and a second opposing surface normal to the direction of deflection;

(b) a plurality of facing layers of fiber impregnated resin adhesively fastened to the first and second opposing surfaces, each of the facing layers normal to the direction of deflection having a higher fiber content than the first fiber content of the core portion to produce a composite beam with a cross section having a varying fiber content thereacross such that the highest fiber content of between greater than about 63 to about 78% by weight is adjacent the first surface of the core portion on the side of the compressive stress in at least one facing layer that is normal to the direction of deflection where the highest stress normal to the direction of loading is located and the compressive stress is a maximum.

14. The resilient constant stress composite beam according to claim 13 wherein the fiber content in at least one facing layer on the second opposing surface is from about 55% to about 75% by weight.

15. The resilient constant stress composite beam according to claim 14 wherein the fiber content of the central core portion is from about 50% to about 60% by weight.

* * * * *